(12) United States Patent
Pifa et al.

(10) Patent No.: US 12,075,828 B2
(45) Date of Patent: Sep. 3, 2024

(54) ELECTRONIC CIGARETTE AND CAPSULE FOR AN ELECTRONIC CIGARETTE

(71) Applicant: JT International S.A., Geneva (CH)

(72) Inventors: Shen Pifa, Shenzhen (CN); Kyle Adair, Lisburn (GB)

(73) Assignee: JT International S.A. (CH)

(*) Notice: Subject to any disclaimer, the term of this patent is extended or adjusted under 35 U.S.C. 154(b) by 644 days.

(21) Appl. No.: 17/266,266

(22) PCT Filed: Aug. 9, 2019

(86) PCT No.: PCT/EP2019/071456
§ 371 (c)(1),
(2) Date: Feb. 5, 2021

(87) PCT Pub. No.: WO2020/030792
PCT Pub. Date: Feb. 13, 2020

(65) Prior Publication Data
US 2021/0298357 A1    Sep. 30, 2021

(30) Foreign Application Priority Data
Aug. 10, 2018    (EP) .................................... 18188590

(51) Int. Cl.
*A24F 40/42*    (2020.01)
*A24F 7/02*    (2006.01)
(Continued)

(52) U.S. Cl.
CPC ................ *A24F 40/42* (2020.01); *A24F 7/02* (2013.01); *A24F 40/10* (2020.01); *A24F 40/44* (2020.01);
(Continued)

(58) Field of Classification Search
CPC .. A24F 40/42; A24F 7/02; A24F 40/10; A24F 40/44; A24F 40/46; A24F 40/48;
(Continued)

(56) References Cited

U.S. PATENT DOCUMENTS 9,986,762 B2    6/2018    Alarcon
2013/0019862 A1    1/2013    Yamada et al.
(Continued)

FOREIGN PATENT DOCUMENTS

CN    204444245 U    7/2015
CN    106455683 A    2/2017
(Continued)

OTHER PUBLICATIONS

International Search Report and Written Opinion for Application No. PCT/EP2019/071456, dated Nov. 20, 2019, 8 pages.
(Continued)

*Primary Examiner* — Justin M Kratt
(74) *Attorney, Agent, or Firm* — Lerner David LLP

(57) ABSTRACT

An electronic cigarette includes an inhaler body and a removable capsule. The inhaler body includes a power unit, a control circuitry and a capsule seating configured to connect with the capsule. The capsule includes a liquid store configured to contain a liquid to be vaporized, a vaporization chamber, a vapor outlet, a vaporizing unit including a heater and a fluid transfer element. The fluid transfer element has a liquid uptake portion located inside the liquid store and a liquid delivery portion in contact with the heater inside the vaporization chamber. A main vapor flow channel extends from the vaporization chamber to the vapor outlet. A first seal sealingly connects the vaporization chamber and the vapor flow channel, whereby the seal is configured to compress the fluid transfer element in the radial direction of
(Continued)

the fluid transfer element in order to control the flow of liquid into the vaporization chamber.

10 Claims, 5 Drawing Sheets

(51) Int. Cl.
| | |
|---|---|
| *A24F 40/10* | (2020.01) |
| *A24F 40/44* | (2020.01) |
| *A24F 40/46* | (2020.01) |
| *A24F 40/48* | (2020.01) |
| *A24F 40/485* | (2020.01) |
| *A24F 40/50* | (2020.01) |
| *A24F 40/40* | (2020.01) |
| *G05B 11/28* | (2006.01) |

(52) U.S. Cl.
CPC .............. *A24F 40/46* (2020.01); *A24F 40/48* (2020.01); *A24F 40/485* (2020.01); *A24F 40/50* (2020.01); *A24F 40/40* (2020.01); *G05B 11/28* (2013.01)

(58) Field of Classification Search
CPC ........ A24F 40/485; A24F 40/50; A24F 40/40; G05B 11/28
See application file for complete search history.

(56) References Cited

U.S. PATENT DOCUMENTS

| | | | |
|---|---|---|---|
| 2013/0037041 A1 | 2/2013 | Worm et al. | |
| 2014/0345635 A1* | 11/2014 | Rabinowitz | A24B 15/167 131/352 |
| 2015/0258289 A1 | 9/2015 | Henry, Jr. et al. | |
| 2016/0073692 A1 | 3/2016 | Alarcon et al. | |
| 2016/0192707 A1* | 7/2016 | Li | H05B 3/00 392/404 |
| 2016/0213065 A1 | 7/2016 | Wensley et al. | |
| 2016/0286865 A1 | 10/2016 | King et al. | |
| 2016/0353804 A1 | 12/2016 | Lord | |
| 2017/0251725 A1 | 9/2017 | Buchberger et al. | |
| 2017/0258132 A1 | 9/2017 | Rostami et al. | |
| 2018/0297047 A1 | 10/2018 | Tong | |

FOREIGN PATENT DOCUMENTS

| | | |
|---|---|---|
| CN | 108366621 A | 8/2018 |
| EP | 2870889 A1 | 5/2015 |
| EP | 3039976 A1 | 7/2016 |
| JP | 2014525237 A | 9/2014 |
| JP | 2017513465 A | 6/2017 |
| JP | 2017532011 A | 11/2017 |
| JP | 2018504926 A | 2/2018 |
| WO | 2011122474 A1 | 10/2011 |

OTHER PUBLICATIONS

Search Report dated Dec. 21, 2023 from the Office Action for Chinese Application No. 201980050482.2 issued Dec. 22, 2023, 3 pages.
Donglai, Z. et al."Electronic Cigarette," Yunnan University Press, Aug. 2015, p. 517.
Search Report dated May 11, 2024 from the Office Action for Chinese Application No. 201980050482.2 issued May 13, 2024, 2 pages.

* cited by examiner

ELECTRONIC CIGARETTE AND CAPSULE FOR AN ELECTRONIC CIGARETTE

CROSS-REFERENCE TO RELATED APPLICATIONS

The present application is a national phase entry under 35 U.S.C. § 371 of International Application No. PCT/EP2019/071456, filed Aug. 9, 2019, published in English, which claims priority to European Application No. 18188590.6 filed Aug. 10, 2018, the disclosures of which are incorporated herein by reference.

CROSS-REFERENCE TO RELATED APPLICATIONS

The present application is a national phase entry under 35 U.S.C. § 371 of International Application No. PCT/EP2019/071456, filed Aug. 9, 2019, published in English, which claims priority to European Application No. 18188590.6 filed Aug. 10, 2018, the disclosures of which are incorporated herein by reference.

FIELD OF INVENTION

The present invention relates to personal vaporizing devices, such as electronic cigarettes. In particular, the invention relates to an electronic cigarette and disposable capsules therefor.

BACKGROUND

Electronic cigarettes are an alternative to conventional cigarettes. Instead of generating a combustion smoke, they vaporize a liquid, which can be inhaled by a user. The liquid typically comprises an aerosol-forming substance, such as glycerin or propylene glycol that creates the vapor. Other common substances in the liquid are nicotine and various flavorings.

The electronic cigarette is a hand-held inhaler system, comprising a mouthpiece section, a liquid store, a power supply unit. Vaporization is achieved by a vaporizer or heater unit which typically comprises a heating element in the form of a heating coil and a fluid transfer element. The vaporization occurs when as the heater heats up the liquid in the wick until the liquid is transformed into vapor. The electronic cigarette may comprise a chamber in the mouthpiece section, which is configured to receive disposable consumables in the form of capsules. Capsules comprising the liquid store and the vaporizer are often referred to as "cartomizers".

Conventional cigarette smoke comprises nicotine as well as a multitude of other chemical compounds generated as the products of partial combustion and/or pyrolysis of the plant material.

Electronic cigarettes on the other hand deliver primarily an aerosolized version of an initial starting e-liquid composition comprising nicotine and various food safe substances such as propylene glycol and glycerine, etc., but are also efficient in delivering a desired Nicotine dose to the user.

The aerosol generated by an electronic cigarette is generally referred to as a vapor. Electronic cigarettes need to deliver a satisfying amount of vapor. The quantity of vapor delivered can be measured in TPM (Total Particulate Matter). However, there is a need for delivering a high amount of vapor, while still keeping the amount of compounds other than those contained in the e-liquid prior to vaporization low.

SUMMARY

It is an object of the present invention to provide an optimized vapor production, by delivering a vapor with high TPM while reducing undesired chemical compounds.

According to a first aspect of the present invention, there is provided an electronic cigarette comprising an inhaler body and a removable capsule, wherein the inhaler body comprises a power unit, a control circuitry and a capsule seating configured to connect with the capsule, the capsule comprising:
  a liquid store configured to contain a liquid to be vaporized,
  a vaporization chamber
  a vapor outlet,
  a vaporizing unit comprising a heater and a fluid transfer element, wherein the fluid transfer element has a liquid uptake portion located inside the liquid store and a liquid delivery portion in contact with the heater inside the vaporization chamber,
  a main vapor flow channel extending from the vaporization chamber to the vapor outlet via a tube or chimney, and
  a first seal configured to sealingly connect the vaporization chamber and the tube or chimney to form the vapor flow channel, whereby the seal is additionally configured to compress the fluid transfer element in the radial direction of the fluid transfer element in order to control the flow of liquid into the vaporization chamber.

The present invention is based on a realization that a high vapor volume or TMP can be generated by providing a vaporization unit with an optimal liquid supply. The first seal is configured to seal around the fluid transfer element such that the vaporizing liquid can only be transported inside the fluid transfer element (instead of leaking around the fluid transfer element—i.e. through any small gaps between the edge of the fluid transfer element and the first seal). Hence, the seal controls the distribution of liquid to the heating element. In such a way, it is possible to ensure a constant liquid distribution such that a high TPM can be achieved, while keeping other undesirable compounds at a low level.

In an exemplary embodiment, the electronic cigarette is configured to power the heating element so as to provide an effective power density of between 0.7 and 1.0 Watt/mm$^2$, preferably between 0.80 and 0.85 Watt/mm$^2$ and more preferably about 0.847 Watt/mm$^2$. In the context of this invention, the power density corresponds to the total amount of power delivered to the resistive heating element divided by the total surface area of the resistive heating wire. The total surface area corresponds to the circumference of the resistive heating wire multiplied with the axial length of the resistive heating wire.

This range of power density values for the heating element in conjunction with an appropriately configured fluid transfer element and heating element arrangement can provide a good TPM of in excess of 5 mg per 55 ml puff without generating excessive quantities of by-products of the vaporization process.

In an embodiment, the gauge of the heating wire is greater than 0.18 mm and preferably between 0.18 and 0.22 mm, and most preferably about 0.2 mm.

This minimizes the risk of localized hotspots which can cause the generation of unwanted chemical by products of the vaporization process, but can provide a large enough effective surface area of the heating element in contact with the fluid transfer element as to generate a good TPM (e.g. of in excess of 5 mg per 55 ml puff).

In an exemplary embodiment, the effective percentage of surface area of the heating element in contact with the fluid transfer element is greater than 20%, for example between 20 and 40% of the surface area of the heating wire, preferably between 30 and 35% and most preferably about 30%.

In an exemplary embodiment, the vaporization unit is configured to produce aerosol with a vapor density of at least 3.5 mg per inhalation. The inhalation corresponds to a volume of 55 ml. In another embodiment, the vaporization unit is configured to produce aerosol with a vapor density of at least 5 mg per 55 ml inhalation and most preferably in excess of 5.5 mg per 55 ml inhalation.

The control circuitry may be configured to provide a pulse width modulated control such that a constant power is generated from the power unit across a predetermined range of power unit voltage levels.

This can help to ensure a consistent performance of the device (both in terms of amount of vapor produced and in terms of the amount of unwanted by-product compounds produced) as the power supply unit naturally reduces its output voltage as it discharges.

The inhaler body may have an axial length of less than 120 mm, preferably between 110 and 90 mm.

A device of this size can accommodate a battery having a capacity of up to 350 mAh which, in some embodiments, can provide over 200 puffs from a single charge of the battery, each of which provides a TPM in excess of 5 mg.

In an exemplary embodiment, the fluid transfer element has a longitudinal extension, which is transverse to the longitudinal direction of the capsule. The heating element is preferably provided on the outside circumference of the fluid transfer element. In an embodiment, the heating element is wound around the fluid transfer element.

Preferably, the winding of the heating element wire around the fluid transfer element is performed with a predetermined tension on the wire such that the fluid transfer element is compressed from its relaxed diameter by a predetermined amount, which is preferably at least 30% or 1 mm whichever is less. As explained in greater detail below, this improves the flow of liquid towards the heating element as well as increasing the effective surface area of the heating element which is in contact with the fluid transfer element. Additionally, the volume in which power is generated is reduced for a given diameter of fluid transfer element which increases the power generated per unit volume which can additionally help to reduce unwanted hot spots.

In an exemplary embodiment, the liquid inlet to the vaporization chamber is provided solely through the fluid transfer element and through the liquid delivery channels formed from the porous structures of the fluid transfer element. This helps to prevent unwanted leakage of liquid from the vaporization chamber.

According to a second aspect of the present invention, there is provided a capsule for an electronic cigarette, the capsule having a first end for engaging with an electronic cigarette device and a second end configured as a mouthpiece portion having a vapor outlet, the capsule further comprising:

a liquid store configured to contain a liquid to be vaporized,
a vaporization chamber
a vapor outlet,
a vaporizing unit comprising a heater and a fluid transfer element, wherein the fluid transfer element has a liquid uptake portion located inside the liquid store and a liquid delivery portion in contact with the heater inside the vaporization chamber,
a main vapor flow channel extending from the vaporization chamber to the vapor outlet, and
a first seal configured to sealingly connect the vaporization chamber and the vapor flow channel, whereby the seal is configured to compress the fluid transfer element in the radial direction of the fluid transfer element in order to control the flow of liquid into the vaporization chamber.

In an exemplary embodiment, the effective circumference of the heating wire of the heating element in contact with the fluid transfer element is between 20 and 40% of the circumference of the heating wire, preferably between 30 and 35% and most preferably about 30%.

In an embodiment, the vapor outlet is provided as a mouthpiece portion of the capsule. However, it is also possible to provide the capsule without a mouthpiece. For instance, the capsule may be provided as an introduced part inside the main body of the electronic cigarette, whereby the main body also includes the mouthpiece portion.

BRIEF DESCRIPTION OF THE DRAWINGS

The invention will now be described with reference to the appended drawings, which by way of example illustrate embodiments of the present invention and in which like features are denoted with the same reference numerals, and wherein:

FIG. 1b is a schematic perspective side view of the electronic cigarette of FIG. 1a;

FIG. 3b is a schematic side view of the capsule of FIG. 3a;

DETAILED DESCRIPTION

Figure 1A:
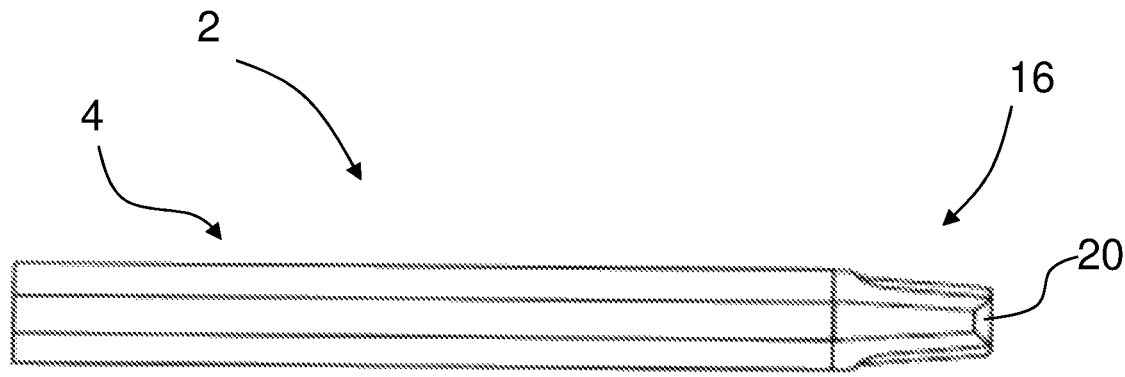
FIG. 1a is a schematic perspective view of an electronic cigarette according to an exemplary embodiment of the present invention.

As used herein, the term "inhaler" or "electronic cigarette" may include an electronic cigarette configured to deliver an aerosol to a user, including an aerosol for smoking. An aerosol for smoking may refer to an aerosol with particle sizes of 0.5-7 microns. The particle size may be less than 10 or 7 microns. The electronic cigarette may be portable.

Referring to the drawings and in particular to FIGS. 1a to 1c, 2a and 2b, an electronic cigarette 2 for vaporizing a liquid L is illustrated. The electronic cigarette 2 can be used as a substitute for a conventional cigarette. The electronic cigarette 2 has a main body 4 comprising a power supply unit 6, electrical circuitry 8 and a capsule seating 12. The capsule seating 12 is configured to receive removable capsules 16 comprising a vaporizing liquid L. The liquid L may comprise an aerosol-forming substance such as propylene glycol and/or glycerol and may contain other substances such as nicotine and acids. The liquid L may also comprise flavorings such as e.g. tobacco, menthol or fruit flavor.

The capsule seating 12 is preferably in the form of a cavity configured to receive the capsule 16. The capsule seating 12 is provided with a connection portion 21 configured to hold the capsule 16 firmly to the capsule seating 12. The connection portion 21 could for instance be an interference fit, a snap fit, a screw fit, a bayoneted fit or a magnetic fit. The capsule seating 12 further comprises a pair of electrical connectors 14 configured to engage with corresponding power terminals 45 on the capsule 16.

Figure 3A:
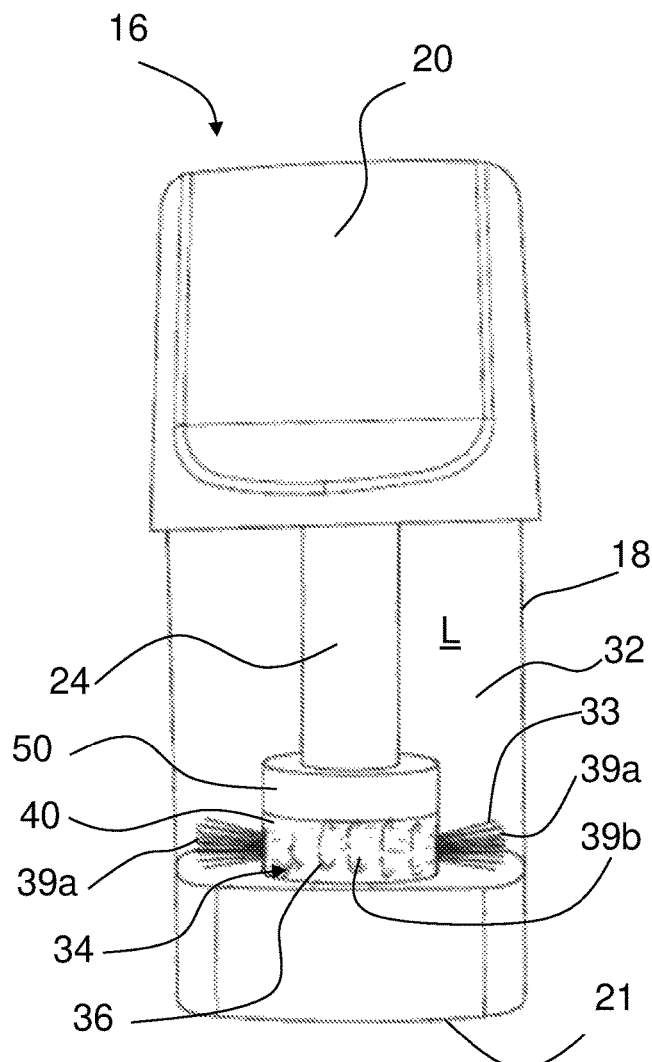
FIG. 3a is a schematic view of a capsule seals according to embodiments of the present invention.
Figure 3B:
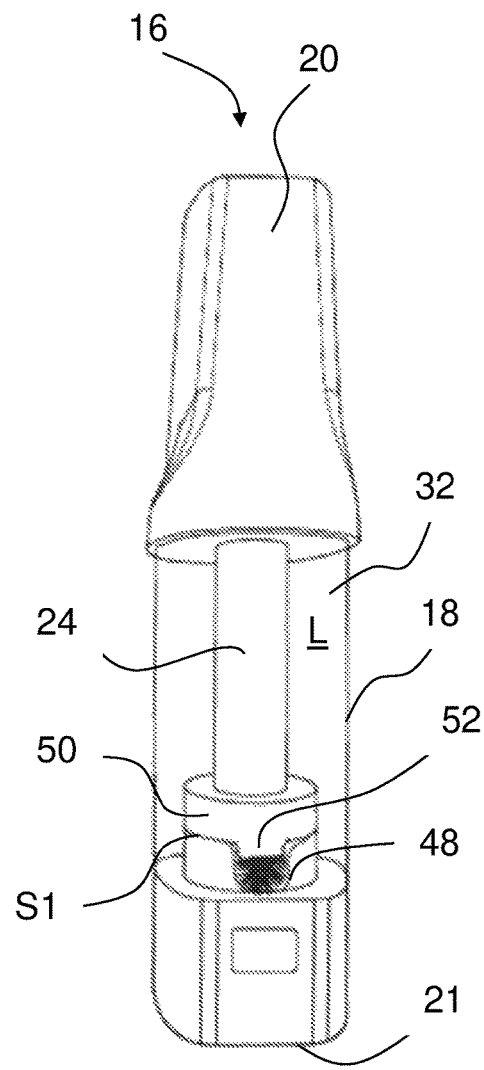

As best seen in FIGS. 3a and 3b, the capsule 16 comprises a housing 18, a liquid store 32, a vaporizing unit 34 and power terminals 45. The housing 18 has a mouthpiece portion 20 provided with a vapor outlet 28. The mouthpiece portion 20 may have a tip-shaped form to correspond to the ergonomics of the user's mouth. On the opposite side of mouthpiece portion 20, the connection portion 21 is located. The connection portion 21 is configured to connect with the connector in the capsule seating 12. The connection portion 21 on the capsule 16 may comprise a metallic plate, configured to magnetically connect to a magnetic surface in the capsule seating 12. The capsule housing 18 may be in a transparent material, whereby the liquid level of the capsule 16 is clearly visible to the user. The housing 18 may be formed in a polymeric or plastic material, such as polyester.

Figure 4:
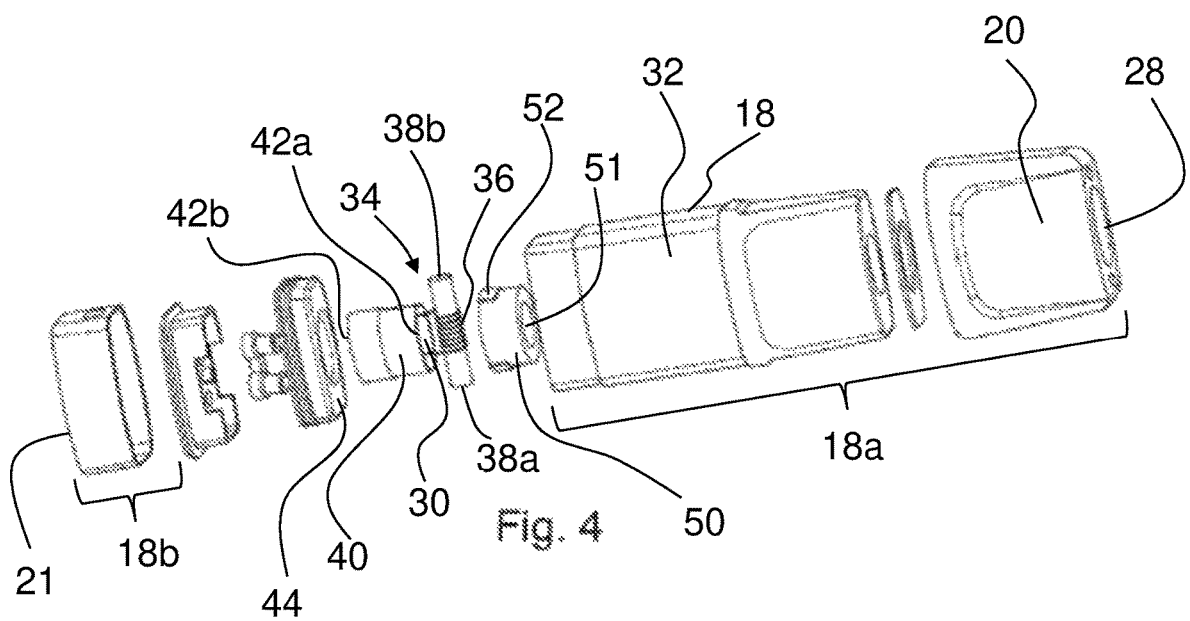
FIG. 4 is an exploded schematic view of a capsule according to an embodiment of the invention.

As seen in FIG. 4, the capsule 16 may be assembled from a plurality of different parts. However, the illustrated embodiment is schematic and it is also possible to combine some of the parts to single units which will be apparent to a person skilled in the art. The present configuration of a plurality of different parts enables an efficient assembly of the capsule 16.

The capsule housing 18 may be formed from a top housing 18a and a bottom housing 18b or a base 18b. The parts can be assembled together by a friction fit between the top housing 18a and a bottom housing 18b. Additionally, or alternatively, the top housing 18a and a bottom housing 18b can be joined together by ultrasonic welding. Optionally, as illustrated in the figure, the top housing 18a may comprise the mouthpiece portion 20 as a separate part that is assembled to the top housing 18a of the capsule.

As best seen in FIG. 3a together with FIG. 4, the vaporization chamber 30 is located at the opposite distal end of the capsule 16 to the mouthpiece portion 20 and houses the vaporizing unit 34. From the vaporization chamber 30 to the vapor outlet 28 in the mouthpiece portion 20, a main vapor channel is defined which may have a tubular cross-section. The main vapor channel 24 can be formed from a tube or chimney 24 which extends distally away from the mouthpiece where it may be sealingly connected to the vaporization chamber 30. Conveniently the tube or chimney 24 can formed integrally with the top housing. This part can for instance be produced by injection molding or molding. Once the tube or chimney 24 is connected to the vaporization chamber 30, the main vapour vapor channel is formed.

The vaporization chamber 30 is surrounded by the liquid store 32. It is sealed such that it only receives liquid through a liquid delivery channel 33, receives intake air from an air inlet 35, and delivers vapor through the main vapor channel (via tube or chimney 24). To this effect, the vaporizing unit 34 is accommodated inside a tubular vaporizer housing 40. The vaporizer housing is provided with an upper rim 42a and a lower rim 42b. The upper rim 42a is in contact with a first seal 50 and the lower rim 42b is in contact with a second seal 44 or lower gasket. The seals 44 and 50 are preferably of a resilient or compressible material to minimize leakage through the connections. The material may for instance be silicone. The lower gasket 44 is configured to seal around the outer circumference of the tubular vaporizer housing 40.

The vaporizing unit 34 comprises a heating element 36 and a fluid transfer element 38. The fluid transfer element 38 is configured to transfer the liquid L by capillary action from the liquid store 32 to the heating element 36. The fluid transfer element 38 can be a fibrous or porous element such as a wick made from twined cotton or silica. Alternatively, the fluid transfer element 38 can be any other suitable porous element.

The vaporization chamber 30 is fluidly connected to the liquid store 32 by the fluid transfer element 38. Hence, the liquid inlet to the vaporization chamber 30 is provided solely through the fluid transfer element 38 and through the liquid delivery channel 33 formed from the porous structures of the fluid transfer element 38.

The fluid transfer element 38 has a first end 38a and a second end 38b. The fluid transfer element 38 is provided with an elongated and substantially straight shape and is preferably arranged with its longitudinal extension perpendicular or traverse to the longitudinal direction of the capsule 16.

The fluid transfer element 38 has a liquid uptake portion 39a located inside the liquid store 32 and a liquid delivery portion 39b in contact with the heating element 36 inside the vaporization chamber 30.

The liquid uptake portion 39a corresponds to the first end 38a and a second end 38b of the fluid transfer element 38. The heating element 36 is positioned on the liquid delivery portion 39b of the fluid transfer element 38. The liquid delivery portion 39b corresponds to the center portion of the elongate fluid transfer element 38. In the embodiment illustrated in the figures, the heating element 36 is provided on the outside circumference of the fluid transfer element 38.

The vaporizer housing 40 is further provided with a pair of cutouts 48 through which the first and the second ends 38a, 38b of the fluid transfer element 38 are received. The first seal 50 is located in the connection between the vaporization chamber 30 and the fluid transfer element 38. The first seal 50 has a contact surface S1 that corresponds to the shape of the upper rim 42a of the vaporizer housing 40. The first seal 50 is further provided with an aperture 51 through which the vapor can flow from the vaporization chamber 30 to the main vapor flow channel. The first seal 50 is preferably provided with radially extending tabs 52 that are configured to be received in the cutouts 48 and to press against the fluid transfer element 38 when the capsule 16 is assembled.

The first seal 50 is configured to compress the fluid transfer element 38 in the radial direction of the fluid transfer element 38. By compressing the fluid transfer element 38, the liquid flow from the liquid store 32 to the vaporization chamber 30 is guided through the fluid transfer element 38. Hence, leakage around the fluid transfer element 38 is prevented.

Figure 5A:
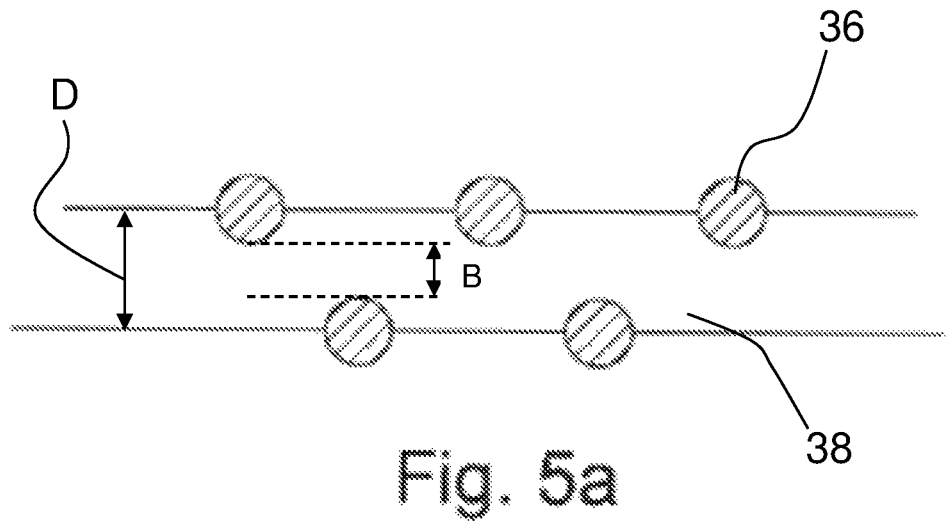
FIG. 5a is a schematic illustration of a cross section of the fluid transfer element with the heating element wound around the fluid transfer element.

As best seen in FIG. 5, the heating element 36 is wound around the fluid transfer element 38. The heating wire 36 is provided with an internal bore B which is smaller than the external diameter D of the fluid transfer element 38.

The heating wire 36 is configured to heat the fluid transfer element 38 by resistive heating. In an advantageous embodiment, the material of the heating wire 36 can be titanium. Titanium has a steep resistance to temperature curve in comparison with e.g. stainless steel or nickel. Hence, the resistance of the heating wire 36 increases relatively rapidly with an increasing coil temperature. However, other materials such as Stainless steel, Nickel, Chrome or Aluminium or alloys thereof are also possible.

The heating coil 36 is provided with a wire gauge (i.e. wire diameter) d. The wire diameter d influences the resistance of the heating coil 38. A larger gauge d provides a lower electrical resistance. The heating coil 36 is provided with a number of turns N arranged with a defined pitch P. The number of turns N and the selected pitch P influence the temperature and heat distribution from the heating element 36 along the fluid transfer element 38.

The overall length L of the heating wire 36 increases with the pitch P and the number of turns N. This results in an increased contact surface area C between the heating element 36 and the fluid transfer element 38. However, an increased contact area C between the fluid transfer element 38 and the heating element 36 also cools down the heating element 36. Moreover, the resistance of the heating wire increases with an increased wire length.

Figure 5B:
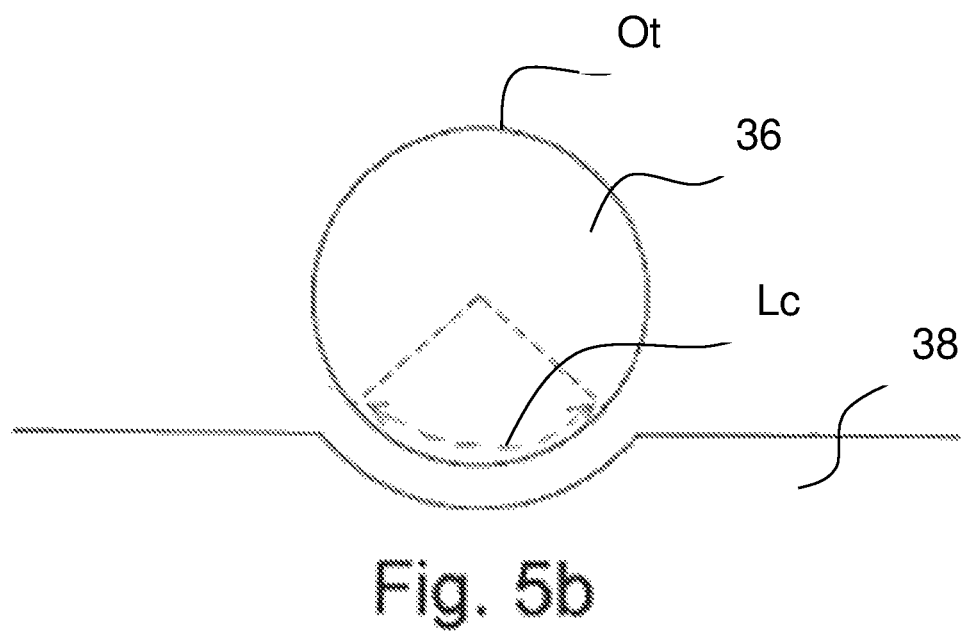
FIG. 5b is a detail of FIG. 5a showing the contact surface between the fluid transfer element and the heating element.

As seen in seen in FIG. 5b, only a portion of the total circumference Ot of the heating wire 36 is in contact with the fluid transfer element 38. This portion can be referred to as a contact length Lc. The contact surface area C of the heating element 36 in contact with the fluid transfer element 38 can therefore be defined as the contact length Lc multiplied with the total axial length La of the heating wire 36 in contact with the fluid transfer element 38.

The main body 4 is configured to supply power to the heating element 36 of the capsule and to control the overall operation of the vaporization. The main body 4 can be configured as a compact device in comparison to most prior art electronic cigarettes. This means that the power unit 6 or battery 6 is relatively small in size. In an embodiment of the present invention the battery is a Lithium battery with an output of about 350 mAh.

The electrical circuitry 8 of the main body 4 is configured to operate the electronic cigarette 2 and may comprises a flow sensor 10 or a manual activation switch, a memory 11 and a controller 13. The electrical circuitry 8 may advantageously be grouped onto a main printed circuit board.

The controller 13 is configured to enable pulse width modulation of the battery output. The pulse width modulation controls the temperature of the heating element 36 and enables savings of the battery power. The output power is modulated such that the output power is constant over time, regardless of if the battery 6 is full or close to depletion. This is advantageous as the present battery is relatively small in size and output voltage.

The inhaler body is preferably provided with a compact shape, having an axial length of preferably less than 150 mm and a thickness of less than 20 mm. Preferably, the device is provided with a dimension that it will fit into the palm of a hand. A particularly preferable dimension of the present electronic cigarette is less than 110 mm and a thickness of less than 2 cm. The smaller the electronic cigarette, the smaller the power source or battery will fit into the electronic cigarette.

Figure 1B:
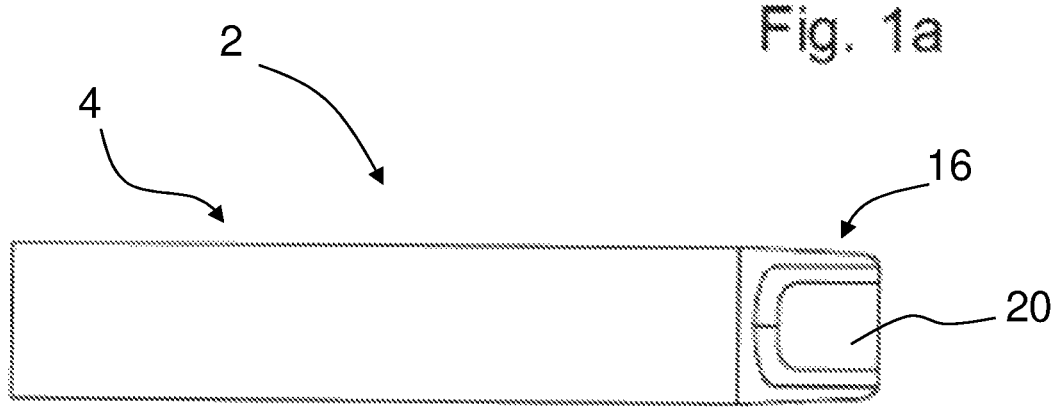
Figure 1C:
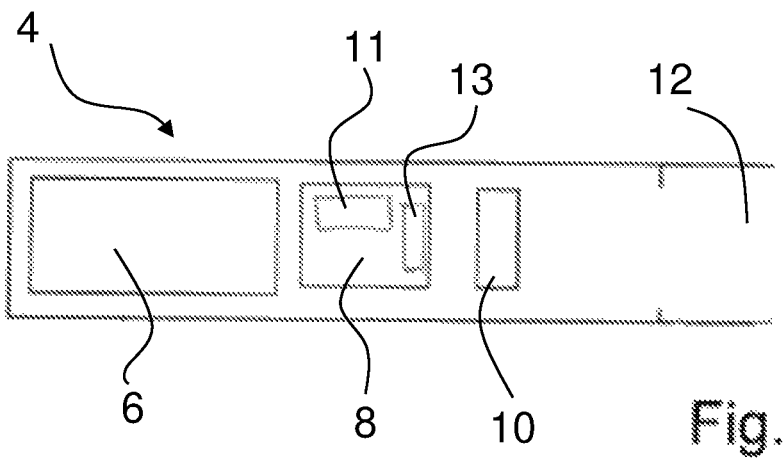
FIG. 1c is a schematic cross-sectional view of the electronic cigarette of FIGS. 1a and 1b.
Figure 2A:
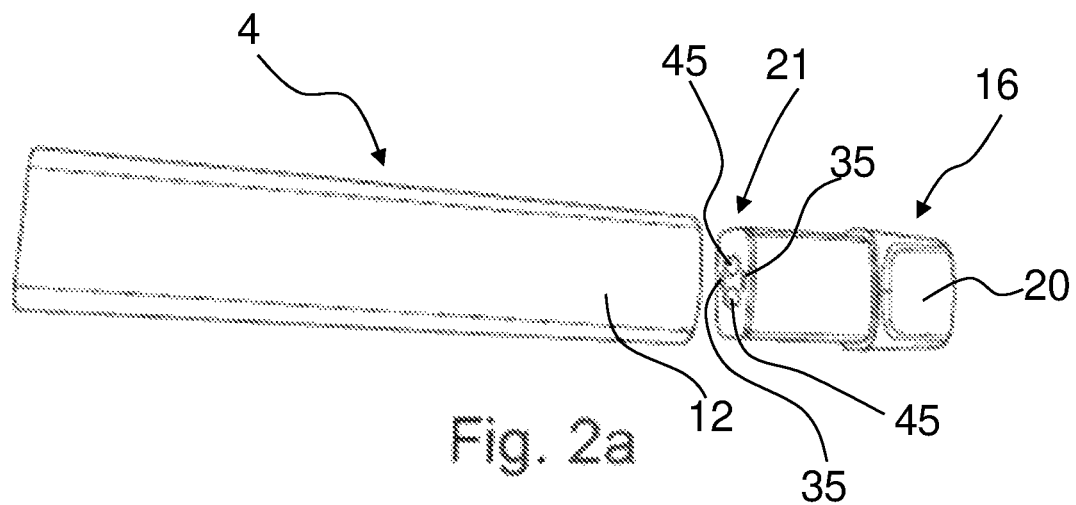
FIG. 2a is a schematic perspective view of the electronic cigarette in FIGS. 1a and 1b, wherein the capsule has been disconnected from the inhaler body.
Figure 2B:
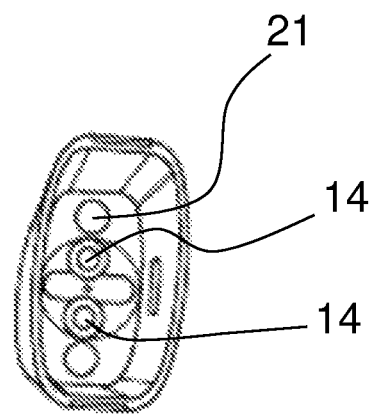
FIG. 2b is a schematic perspective view of a capsule seating according to an exemplary embodiment of the present invention.

The inventors have found that a high TPM can still be achievable by ensuring an efficient power supply and an efficient vaporization. However, some of the first embodiments of the present invention did not provide a satisfying performance. As illustrated in FIGS. 1a and 1b, the capsule 16 and the inhaler body of the electronic cigarette may have a shape that is not rotationally symmetrical in the axial direction. The capsule 16 may therefore have a rectangular base with flat longer side and a short side.

It is desirable to ensure that the temperature of the heating element is at a temperature at which an efficient vaporization occurs. This is because if the temperature of the heating coil is insufficient, the liquid L is prone to get into a boiling stage rather than in a desired vaporization state. It is desirable to ensure a sufficiently high heating element temperature such that the liquid transforms straight into the vaporization state. Thereby, undesirable liquid projections can be alleviated. Additionally, it would be desirable to provide a high vapor volume with a high TPM (Total particulate matter), while keeping the amount of undesirable chemical compounds at a low level.

The inventors were tasked with the development of a compact electronic cigarette with high vapor delivery capabilities. Based on this requirement, a first prototype was developed with the assumption that a relatively high power density was required. A test liquid comprising mostly a mixture of Vegetable Glycerin (VG) and Propylene Glycol (PG) with ratios of between VG:PG=50:50, Nicotine 1.59% Flavorants 1% was used.

A first prototype as per example 1 was dimensioned as follows:

Example 1

Resistance ($\Omega$): 1.96
Width (mm): 4.40-4.80
Bore (mm): 2.10-2.20
Number of turns: 4.5
Heating wire gauge (mm): 0.15
Pitch (mm): 1.0
Measured TPM (mg/puff): 3.3
Battery output, Vrms (V): 3.55
Power density 1.3 Watt/mm$^2$
Fluid Transfer Element
Material of the fluid transfer element: Cotton
Density of the fluid transfer element (g/m): 1.0
Length of the fluid transfer element (mm): 12.0
Diameter of the fluid transfer element (mm): 3

The analysis of this first prototype was not considered entirely satisfying in regards to the vapor volume and TPM produced. Additionally, it was desired to try to further the levels of undesirable chemical compounds. The inventors were therefore faced with the challenge of trying to further increase the vapor volume (TPM), while reducing the undesired chemical compounds. The inventors came up with the realization that undesirable compounds were potentially formed by an irregular heating temperature along the heating element. This irregular temperature can be caused by uneven absorption of liquid inside the fluid transfer element as well as variation in the contact surface between the heating element and the fluid transfer element.

The inventors believed that a more uniform heat distribution was needed in order to overcome these problems. This could be achieved by a number of measures such as an improved contact surface between the heating element and the fluid transfer element. In this contact area, the fluid distribution from the fluid transfer element to the heating element needed to be improved, as well as an optimization of the vaporization temperature. Additionally, the fluid transportation from the liquid store to the proximity of the heating wire could have an advantageous effect. The same test liquid was used for a second prototype. Based on these realizations, a second prototype as per example 2 was dimensioned as follows:

Example 2

Resistance (Ω): 1.60
Width (mm): 4.40
Bore (mm): 2.0
Number of turns: 7
Heating wire gauge (mm): 0.2
Pitch (mm): 0.6
Measured TPM (mg/puff): 5.5
Battery output, Vrms (V): 3.4
Power density 0.85 Watt/mm$^2$
Fluid Transfer Element
Material of the fluid transfer element: Cotton
Density of the fluid transfer element (g/m): 1.0
Length of the fluid transfer element (mm): 12.0
Diameter of the fluid transfer element (mm): 3

By reducing the bore size of the heating element coil, the wire was also positioned deeper into the fluid transfer element. The contact area between the heating element and the fluid transfer element was thereby further increased. As only a portion of the heating wire is actually in direct contact with the fluid transfer element. The effective contact area between the heating element and the fluid transfer element was determined to be 30% of the entire surface area of the heating coil in contact with the fluid transfer element.

In a preferred embodiment, the internal bore of the heating element corresponds to between 50 and 70% of the external diameter of the fluid transfer element. More preferably, the internal bore of the heating element corresponds to 66% of the external diameter of the fluid transfer element.

This ensures an efficient heat transfer between the heating element and the fluid transfer element by increasing the contact surface between the heating element and the fluid transfer element.

Moreover, by locally compressing the fluid transfer element in the proximity of the heater, the capillarity is increased locally. This also has the effect that the liquid transportation towards the heating element is enhanced.

Hence, the characteristics of the fluid transfer element remained the same, while the characteristics of the heating element were modified. The results of the second prototype were satisfying. The TPM had increased with 67%, while measured carbonyls reduced drastically. For example, Formaldehyde decreased from 99 µg per thirty puffs to 1.5 µg per thirty puffs.

Further analysis proved that advantageous dimensions of the vaporizing unit may be: Power density of between 0.7 and 1.0 Watt/mm$^2$, preferably between 0.80 and 0.85 Watt/mm$^2$ and more preferably about 0.847 Watt/mm$^2$.

Heating wire gauge is greater than 0.18 mm and preferably between 0.18 and 0.22 mm, and most preferably about 0.2 mm.

An effective percentage of surface area of the heating element in contact with the fluid transfer element of between 20 and 40% of the surface area of the heating wire, preferably between 30 and 35% and most preferably about 30%.

The skilled person will realize that the present invention by no means is limited to the described exemplary embodiments. The mere fact that certain measures are recited in mutually different dependent claims does not indicate that a combination of these measures cannot be used to advantage. Moreover, the expression "comprising" does not exclude other elements or steps.

Other non-limiting expressions include that "a" or "an" does not exclude a plurality and that a single unit may fulfill the functions of several means. Any reference signs in the claims should not be construed as limiting the scope. Finally, while the invention has been illustrated in detail in the drawings and in the foregoing description, such illustration and description is considered illustrative or exemplary and not restrictive; the invention is not limited to the disclosed embodiments.

The invention claimed is:

1. An electronic cigarette comprising an inhaler body and a removable capsule, wherein the inhaler body comprises a power unit, a control circuitry and a capsule seating configured to connect with the capsule, the capsule comprising:
   a liquid store configured to contain a liquid to be vaporized,
   a vaporization chamber,
   a vapor outlet,
   a vaporizing unit comprising a heating element and a fluid transfer element, wherein the fluid transfer element has a liquid uptake portion located inside the liquid store and a liquid delivery portion in contact with the heating element inside the vaporization chamber,
   a main vapor flow channel extending from the vaporization chamber to the vapor outlet via a tube or chimney, and
   a seal configured to sealingly connect the vaporization chamber and the tube or chimney to form the main vapor flow channel, whereby the seal is additionally configured to compress the fluid transfer element in a radial direction of the fluid transfer element in order to control a flow of liquid into the vaporization chamber;
   wherein the electronic cigarette is configured to power the heating element so as to provide an effective power density of between 0.7 and 1.0 Watt/mm$^2$;
   wherein an effective percentage of a surface area of the heating element in contact with the fluid transfer element is between 20 and 40% of the surface area of a heating wire of the heating element; and
   wherein the vaporizing unit is configured to produce aerosol with a vapor density of at least 3.5 mg per 55 ml inhalation.

2. The electronic cigarette according to claim 1, wherein a gauge of a heating wire of the heating element is greater than 0.18 mm.

3. The electronic cigarette according to claim 1, wherein the vaporizing unit is configured to produce aerosol with a vapor density of at least 5.5 mg per 55 ml inhalation.

4. The electronic cigarette according to claim 1, wherein the control circuitry is configured to provide a pulse width modulated control such that a constant power is generated from the power unit across a predetermined range of power unit voltage levels.

5. The electronic cigarette according to claim 1, wherein the inhaler body has an axial length of less than 120 mm.

6. The electronic cigarette according to claim 1, wherein the fluid transfer element has a longitudinal extension, which is transverse to a longitudinal direction of the capsule.

7. The electronic cigarette according to claim 6, wherein the heating element is provided on an outside circumference of the fluid transfer element.

8. The electronic cigarette according to claim 7, wherein the heating element is wound around the fluid transfer element.

9. The electronic cigarette according to claim 8, wherein a liquid inlet to the vaporization chamber is provided solely through the fluid transfer element and through liquid delivery channels formed from porous structures of the fluid transfer element.

10. The electronic cigarette according to claim 1, wherein the capsule has a first end for engaging with an electronic cigarette device and a second end configured as a mouthpiece portion having the vapor outlet.

\* \* \* \* \*